United States Patent [19]

Fornuto et al.

[11] Patent Number: 4,725,040

[45] Date of Patent: Feb. 16, 1988

[54] EXHAUST GAS RECIRCULATION VALVE ASSEMBLY

[75] Inventors: Joseph Fornuto, Rochester; Peter R. Wendt, Fairport, both of N.Y.

[73] Assignee: General Motors Corporation, Detroit, Mich.

[21] Appl. No.: 918,359

[22] Filed: Oct. 14, 1986

Related U.S. Application Data

[63] Continuation-in-part of Ser. No. 833,803, Feb. 28, 1986, abandoned.

[51] Int. Cl.[4] .................... F16K 31/06; F16K 41/00

[52] U.S. Cl. .................... 251/129.15; 251/214; 137/883

[58] Field of Search .................... 251/129.15, 214; 137/883

[56] References Cited

U.S. PATENT DOCUMENTS

| | | | |
|---|---|---|---|
| 2,889,904 | 6/1959 | Martinoli . | |
| 2,929,405 | 3/1960 | Beebe | 251/214 X |
| 3,520,312 | 7/1970 | Ackerman et al. . | |
| 3,625,474 | 12/1971 | Juede | 251/129.15 X |
| 3,673,993 | 7/1972 | Nakajima et al. . | |
| 3,762,384 | 10/1973 | Day et al. . | |
| 3,782,348 | 1/1974 | Linder . | |
| 3,791,360 | 2/1974 | Rieger . | |
| 3,799,133 | 3/1974 | Frank . | |
| 3,894,713 | 7/1975 | Ito et al. . | |
| 3,902,696 | 9/1975 | Ito et al. . | |
| 3,980,063 | 9/1976 | Henault . | |
| 4,052,969 | 10/1977 | Ando et al. . | |
| 4,100,234 | 7/1978 | Lindberg et al. . | |
| 4,479,505 | 10/1984 | Kasprik et al. | 251/214 X |

FOREIGN PATENT DOCUMENTS

| | | | |
|---|---|---|---|
| 2504443 | 8/1976 | Fed. Rep. of Germany | 251/214 |

*Primary Examiner*—Arnold Rosenthal

*Attorney, Agent, or Firm*—C. K. Veenstra

[57] ABSTRACT

A valve assembly for controlling recirculation of exhaust gases has three solenoid operated valve members that meter flow of exhaust gases through calibrated outlets from an exhaust gas chamber. Each valve member has a valve stem extending to its solenoid armature, and each valve stem is surrounded by a pair of spring-biased seals that seal the openings around the valve stems into the solenoid coils and the chamber. In this assembly, each armature-valve member-seal floats laterally to compensate for potential misalignment between the solenoid coils and the outlets.

3 Claims, 6 Drawing Figures

EXHAUST GAS RECIRCULATION VALVE ASSEMBLY

This is a continuation-in-part of application Ser. No. 833,803 filed Feb. 28, 1986, now abandoned.

TECHNICAL FIELD

This invention relates to a valve assembly for controlling recirculation of exhaust gases in an internal combustion engine.

BACKGROUND AND SUMMARY OF THE INVENTION

When employing an electrically actuated valve assembly to control exhaust gas recirculation, the actuator should be isolated from the exhaust gases to assure proper operation. Electrically actuated valve assemblies heretofore proposed for controlling exhaust gas recirculation have not isolated the actuator from the exhaust gases in a practical manner.

This invention provides a practical electrically actuated exhaust gas recirculation valve assembly in which the actuator is isolated from the exhaust gases to assure proper operation.

In a preferred embodiment of an exhaust gas recirculation valve assembly employing this invention, a valve member controls the flow of exhaust gases from an exhaust gas chamber through a calibrated valve seat. A solenoid coil is located outside the chamber, and the valve member has a valve stem extending to a solenoid armature surrounded by the coil. The valve stem is surrounded by a pair of spring-biased seals that seal the openings around the valve stem into the solenoid coil and the chamber, and the armature-valve member-seal subassembly floats laterally to compensate for potential misalignment between the solenoid coil and the outlet.

The details as well as other features and advantages of three embodiments of this invention are set forth in the remainder of the specification and are shown in the drawing.

THE PREFERRED EMBODIMENTS

Figure 1:
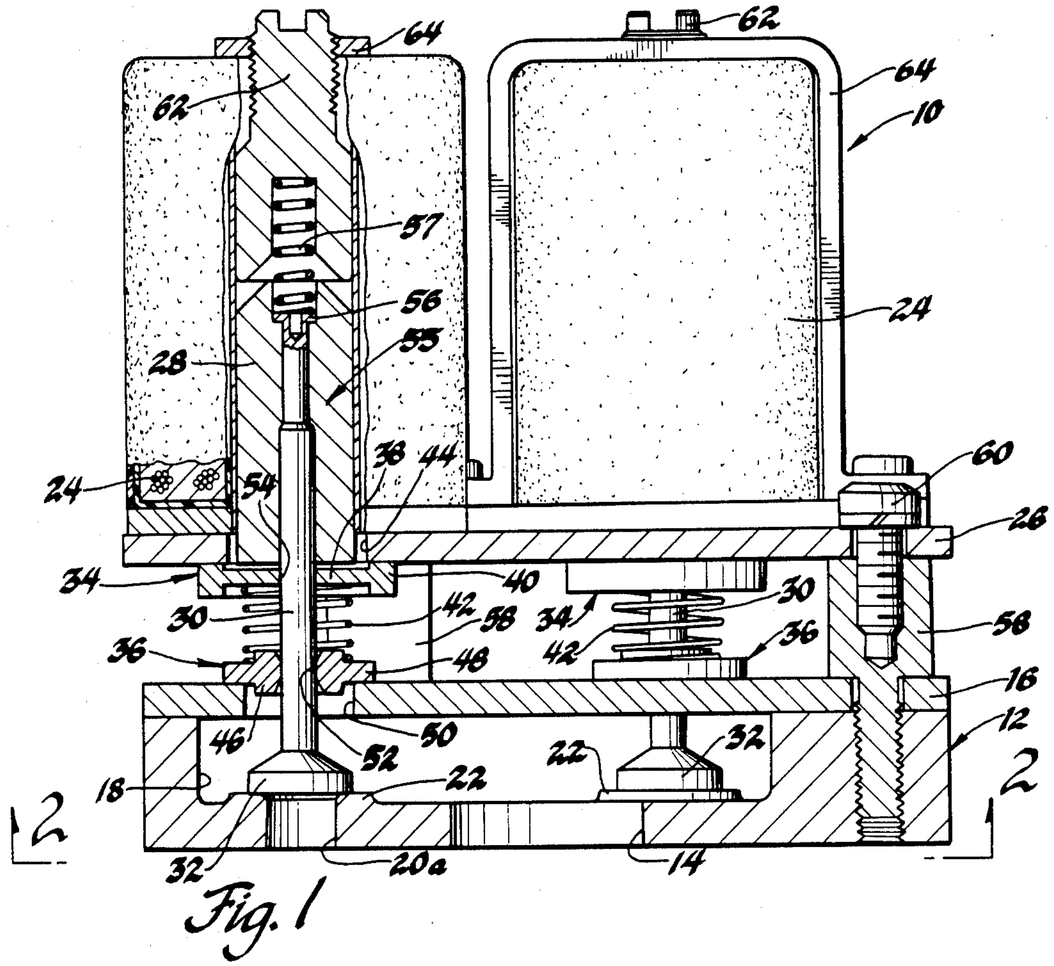
FIG. 1 is a sectional view of a first embodiment of an exhaust gas recirculation valve assembly incorporating this invention.
Figure 2:
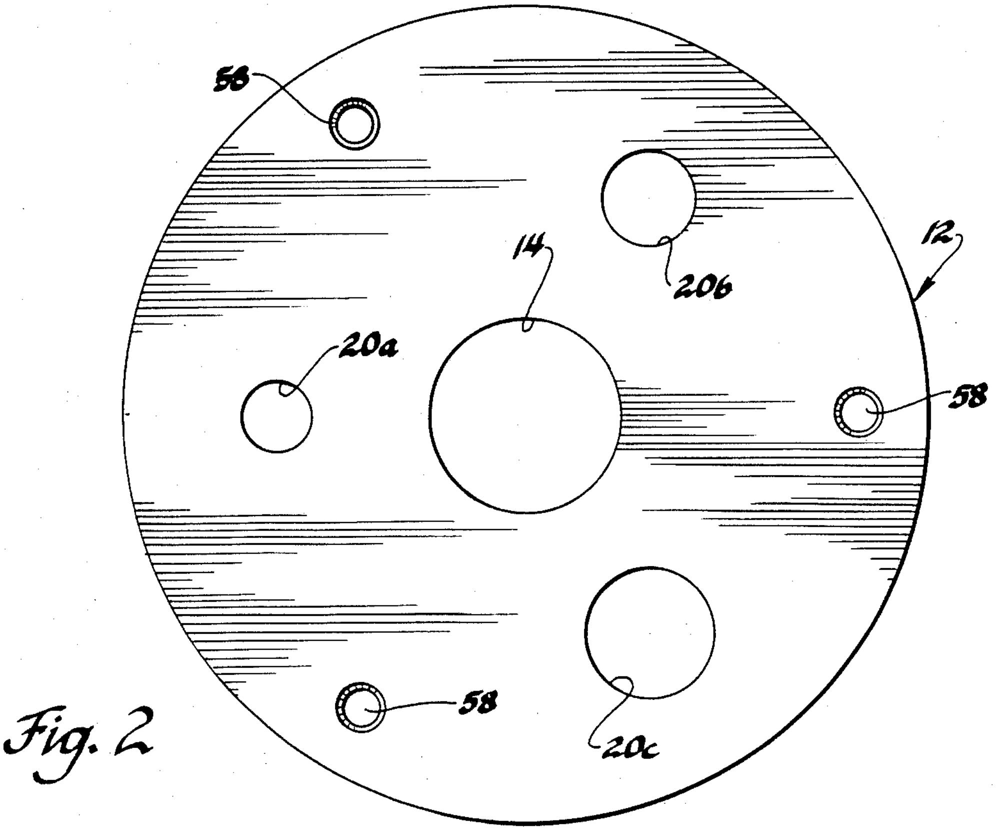
FIG. 2 is a bottom view of the FIG. 1 embodiment, showing the calibrated outlets.
Figure 3:
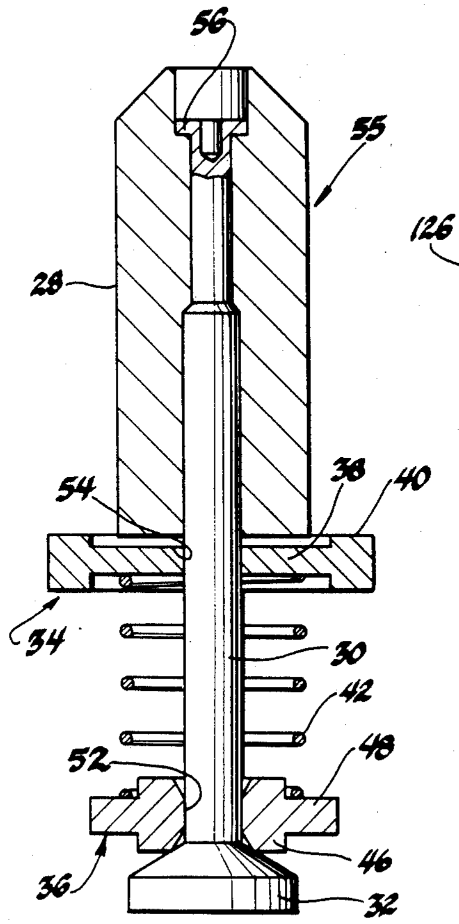
FIG. 3 is an enlarged view of the armature-valve member-seal subassembly employed in FIG. 1 embodiment.

Referring first to FIGS. 1–3, an exhaust gas recirculation valve assembly 10 includes a base 12 having an inlet 14 for receiving exhaust gas from the engine. A cover 16 overlies base 12 to enclose an exhaust gas chamber 18, and base 12 has three calibrated outlets 20*a*, 20*b*, 20*c* each surrounded by a valve seat 22.

A solenoid coil 24 is mounted on a bracket 26 over each valve seat 22. Each coil 24 surrounds an armature 28, and a valve stem 30 extends from each armature 28 to a valve member 32 disposed in chamber 18.

A pair of seals 34 and 36 surround each valve stem 30. Each upper or bracket seal 34 has a central disk 38 embracing valve stem 30 and a peripheral lip 40 biased by a spring 42 to engage bracket 26. Bracket seals 34 seal the openings 44 through bracket 26 about valve stems 30 and armatures 28.

Each lower or cover seal 36 has a hub 46 embracing valve stem 30 and a peripheral flange 48 biased by spring 42 to engage cover 16. Cover seals 36 seal the openings 50 through cover 16 about valve stems 30.

Seals 34 and 36 are formed of sintered graphite bronze, stainless steel, or other material selected to provide the desired lubricity and wear resistance. The bore 52 through the hub 46 of lower seal 36 may be chamfered at top and bottom to allow valve stem 30 to slide easily through seal 36. Chamfers are not required on the bore 54 through the thin central disk 38 of upper seal 34. To construct valve assembly 10, three solenoid coils 24 are secured on bracket 26 and the coil-bracket subassembly is inverted. Three armature-valve member-seal subassemblies 55 are made by placing lower seal 36, spring 42 and upper seal 34 on valve stem 30, placing armature 28 on valve stem 30, and upsetting the tip 56 of valve stem 30 to secure the armature-valve member-seal subassembly. Springs 57 are inserted in each solenoid coil 24, and armatures 28 are then inserted through bracket openings 44 into solenoid coils 24. Cover 16 is secured to base 12 by fasteners 58, and the cover-base subassembly is inverted, assembled with valve members 32 extending through openings 50 to engage valve seats 22, and secured to bracket 26 with fasteners 60.

Springs 42 react between the central disk portion 38 of upper seal 34 and the peripheral flange portion 48 of lower seal 36 to engage seal 34 with bracket 26 and seal 36 with cover 16.

In operation, each spring 57 biases its armature 28 and valve stem 30 to engage its valve member 32 with the associated valve seat 22. When a solenoid coil 24 is energized, its armature 28 and valve stem 30 are lifted against the bias of its spring 57 and its valve member 32 is raised away from the associated valve seat 22 to allow recirculation of exhaust gases.

Preferably, the areas of outlets 20*a*, 20*b*, 20*c* are calibrated as a binary series with the area of outlet 20*b* twice that of outlet 20*a* and the area of outlet 20*c* twice that of outlet 20*b*; in some applications, however, other combinations of outlet areas may be used. Recirculation of exhaust gases is metered by energizing the appropriate solenoid coil or coils 24 to raise the appropriate valve member or members 32 away from the associated valve seat or seats 22 and thus allow recirculation of exhaust gases through one or more of the calibrated outlets 20*a*, 20*b*, 20*c*.

Each solenoid coil 24 has a pole piece 62 threaded into a yoke 64. Adjustment of pole piece 62 in yoke 64 determines the preload that the associated spring 57 exerts on its armature-valve stem-valve member, the air gap between its armature 20 and its pole piece 62 when its coil 24 is not energized, and the travel of its armature-valve stem-valve member when its coil 24 is energized.

Although the assembly 10 is shown here as having a circular base 12, it is clear that other configurations could be adopted within the space limitations of the particular engine application.

Figure 4:
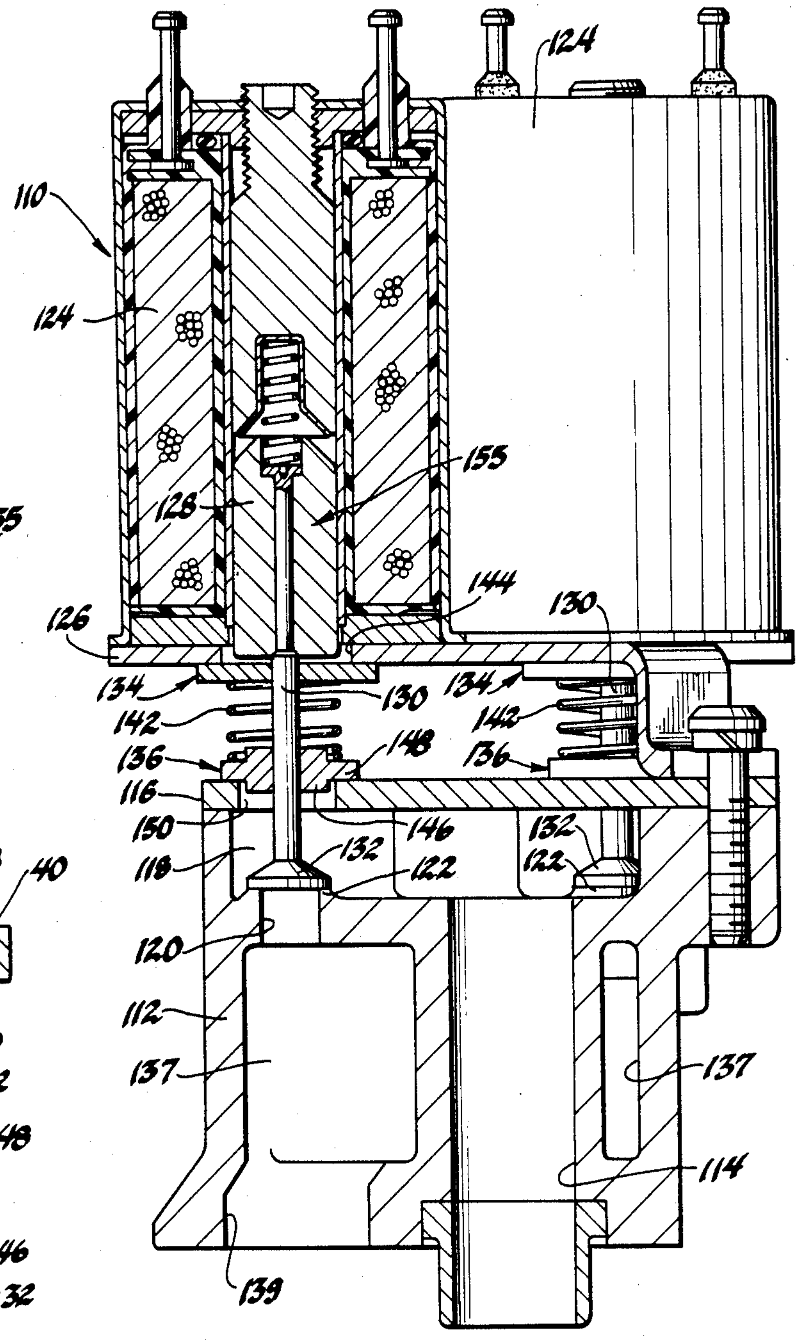
FIG. 4 is a partially sectional view of a second embodiment of an exhaust gas recirculation valve assembly incorporating this invention.

Referring now to FIG. 4, an exhaust gas recirculation valve assembly 110 includes a base 112 having an inlet 114 for receiving exhaust gas from the engine. A cover 116 overlies base 112 to enclose an exhaust gas chamber 118, and base 112 has three calibrated outlets 120 (only one being shown) each surrounded by a valve seat 122.

A solenoid coil 124 is mounted on a bracket 126 over each valve seat 122. Each coil 124 surrounds an armature 128, and a valve stem 130 extends from each armature 128 to a valve member 132 disposed in chamber 118.

A pair of seals 134 and 136 surround each valve stem 130. Each upper or bracket seal 134 embraces valve stem 130 and is biased by a spring 142 to engage bracket 126. Bracket seals 134 seal the openings 144 through bracket 126 about valve stems 130 and armatures 128.

Each lower or cover seal 136 has a hub 146 embracing valve stem 130 and a peripheral flange 148 biased by spring 142 to engage cover 116. Cover seals 136 seal the openings 150 through cover 116 about valve stems 130.

Seals 134 and 136 are formed of sintered graphite bronze, stainless steel, or other material selected to provide the desired lubricity and wear resistance.

The base 112 of assembly 110 has a discharge chamber 137 to route exhaust gases metered through outlets 120 to a common discharge opening 139.

The embodiment shown in FIG. 4 is assembled, adjusted and operated in the manner described above for the embodiment shown in FIGS. 1–3.

Figure 5:
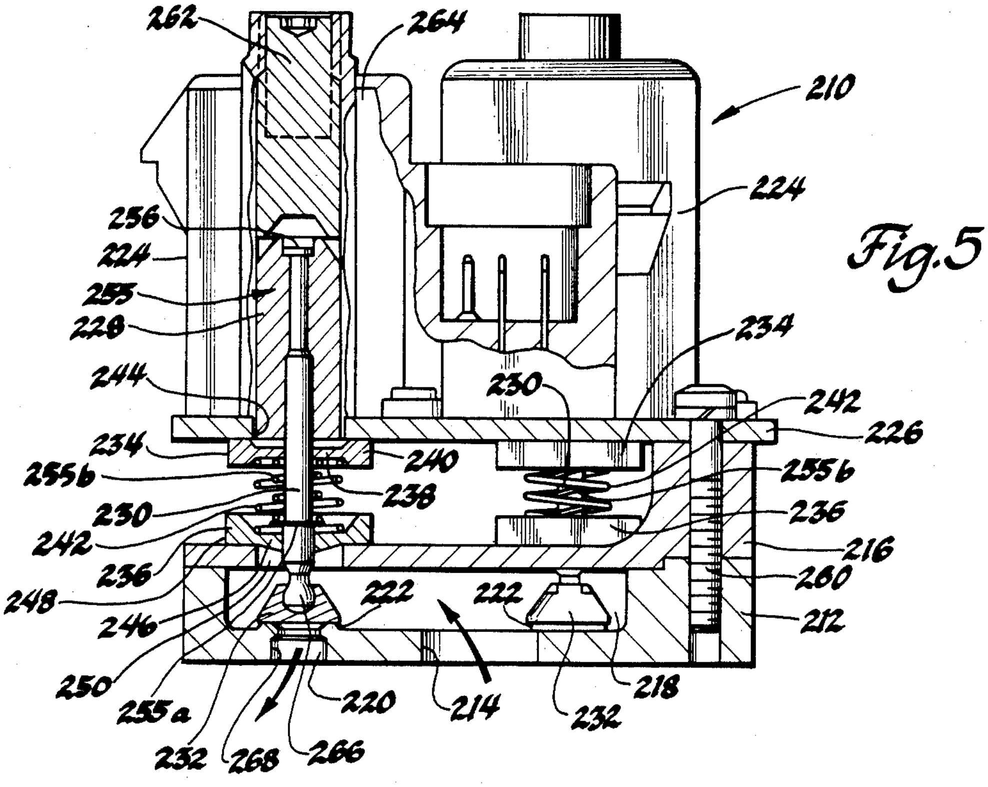
FIG. 5 is a partially sectional view of a third embodiment of an exhaust gas recirculation valve assembly incorporating this invention.
Figure 6:
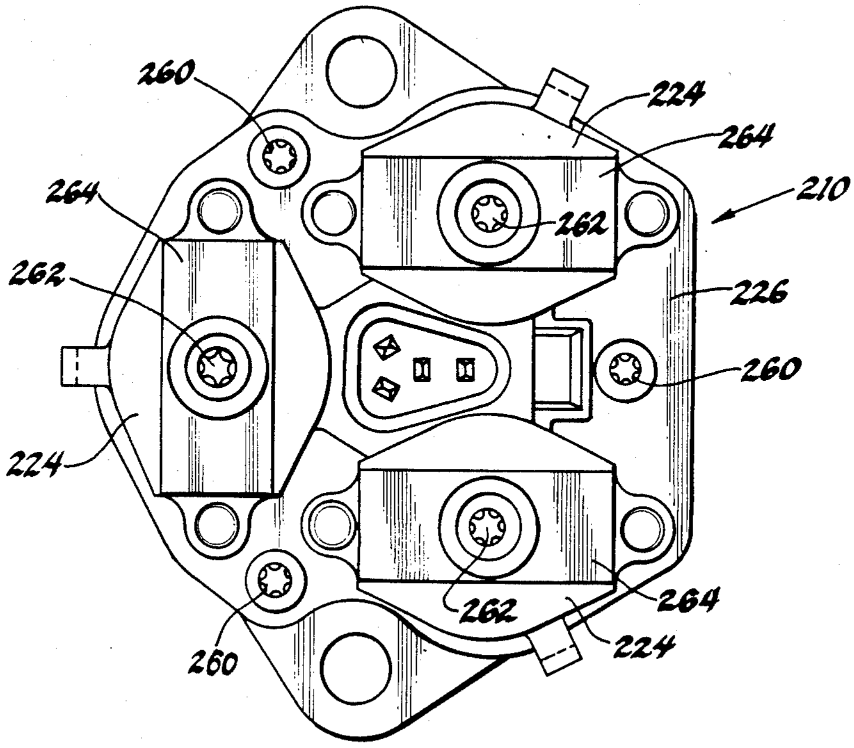
FIG. 6 is a plan view of the FIG. 5 embodiment.

Referring next to FIGS. 5–6, an exhaust gas recirculation valve assembly 210 includes a base 212 having an inlet 214 for receiving exhaust gas from the engine. A cover 216 overlies base 212 to enclose an exhaust gas chamber 218, and base 212 has three calibrated outlets 220 (only one being shown) each surrounded by a valve seat 222.

A solenoid coid 224 is mounted on a bracket 226 over each valve seat 222. Each coil 224 surrounds an armature 228, and a valve stem 230 extends from each armature 228 to a valve member 232 disposed in chamber 218.

A pair of seals 234 and 236 surround each valve stem 230. Each upper or bracket seal 234 has a central disk 238 embracing valve stem 230 and a peripheral lip 240 biased by a spring 242 to engage bracket 226. Bracket seals 234 seal the openings 244 through bracket 236 about valve stems 230 and armatures 228.

Each lower or cover seal 236 has a central disk 246 embracing valve stem 230 and a peripheral rim 248 biased by spring 242 to engage cover 216. Cover seals 236 seal the openings 250 through cover 216 about valve stems 230.

Seals 234 and 236 are formed of a material such as sintered graphite bronze selected to provide the desired lubricity and wear resistance. In addition, the central disk portion 246 of lower seal 236 scrapes valve stem 230 to prevent any accumulation of deposits on stem 230.

To construct valve assembly 210, three solenoid coils 224 are secured on brackets 226, and three armature-valve member-seal subassemblies 255 are made by placing valve member 232, lower seal 236, spring seat **255*a* and return spring 255*b*, seal spring 242 and upper seal 234 on valve stem 230, placing armature 228 on valve stem 230, and upsetting the tip 256 of valve stem 230 to secure the armature-valve member-seal subassembly. Armatures 228 are then inserted through bracket openings 244 into solenoid coils 224, the cover 216 and base 212 is assembled with valve members 232 extending through openings 250 to engage valve seats 222, and fasteners 260 are inserted through bracket 226 and cover 216 and threaded into base 212**.

Springs 242 react between the central disk portion 238 of upper seal 234 and the central disk portion 248 of lower seal 236 to engage seal 234 with bracket 226 and seal 236 with cover 216.

In operation, each spring **255*b* biases its armature 228 and valve stem 230 to engage its valve member 232 with the associated valve seat 222. When a solenoid coil 224 is energized its armature 228 and valve stem 230 are lifted against the bias of its spring 255b and its valve member 232 is raised away from the associated valve seat 222** to allow recirculation of exhaust gases.

Each solenoid coil 224 has a pole piece 262 threaded into a yoke 264. Adjustment of pole piece 262 in yoke 264 determines the air gap and travel of its armature-valve stem-valve member. After adjusting pole piece 262 in yoke 264, yoke 264 is crimped laterally to prevent changes in the adjustment.

Each valve member 232 swivels on a ball 266 formed at the end of its valve stem 230 to assure proper alignment of the valve member 232 on its valve seat 222.

It will be noted that each orifice 220 has the narrowest opening at the top and a wider region 268 below. With this construction, any deposits that tend to accumulate in the orifice 220 would be pushed by the valve member 232 in the direction of flow through the orifice 220 into the wider region 268, thereby reducing the potential for plugging of orifice 220.

It will be appreciated that exhaust gas recirculation also could be metered with these assemblies by operating one or more solenoids as linear solenoids that vary the extent to which the valve member may be lifted away from its valve seat and thus vary the flow area between the valve member and its valve seat. Moreover, one or more solenoids could be operated as pulse width modulated or frequency modulated solenoids that vary the time during which the valve member is lifted away from its valve seat and thus vary the flow past the valve member.

In each embodiment, moreover, it will be appreciated that a solenoid coil 24, 124, 224 might not be precisely aligned over a valve seat 22, 122, 222. With this invention, however, the valve stem 30, 130, 230 is not constrained by a fixed seal in the cover opening 50, 150, 250. Instead, the armature-valve member-seal subassemblies 55, 155, 255 float laterally to compensate for potential misalignment of the solenoid coils 24, 124, 224 while still assuring that bracket openings 44, 144, 244 and cover openings 50, 150, 250 are sealed.

It will be noted that the central disk portions 246 of lower or cover seals 236 are slightly convex to assist in centering within openings 250 during assembly but shall allow seals 236 to float laterally as indicated above.

The embodiments of the invention in which an exclusive property or privelege is claimed are defined as follows:

1. An exhaust gas recirculation valve assembly including a base having an exhaust gas chamber with an inlet opening and an outlet opening, and a valve seat surrounding one of said openings, said base including a cover closing said chamber, said cover having a flat surface with an opening generally aligned with said valve seat, a valve stem extending through said cover opening, a valve member mounted adjacent said valve seat at one end of said valve stem, and an actuator at the other end of said valve stem, said actuator being energizable for operating said valve stem to reciprocate said valve member into and out of engagement with said valve seat, and wherein said assembly further comprises a seal surrounding said valve stem outside said chamber, and a spring surrounding said valve stem biasing said seal into engagement with said flat surface of said cover to seal said cover opening while permitting lateral movement of said valve stem relative to said cover.

2. An exhaust gas recirculation valve assembly including a base having an exhaust gas chamber with an inlet opening and an outlet opening, and a valve seat surrounding one of said openings, said base including a cover closing said chamber, said cover having a flat surface with an opening generally aligned with said valve seat, a valve stem extending through said cover opening, a valve member mounted in said chamber at one end of said valve stem, a solenoid armature mounted at the other end of said valve stem, and a solenoid coil surrounding said armature and energizable for operating said valve stem to reciprocate said valve member into and out of engagement with said valve seat, and wherein said assembly further comprises a seal surrounding said valve stem outside said chamber, and a spring surrounding said valve stem biasing said seal into engagement with said flat surface of said cover to seal said cover opening while permitting lateral movement of said valve stem relative to said cover.

3. An exhaust gas recirculation valve assembly including a base having an exhaust gas chamber with an inlet opening and an outlet opening, and a valve seat surrounding one of said openings, said base including a cover closing said chamber, said cover having a flat surface with an opening generally aligned with said valve seat, a valve stem extending through said cover opening, a valve member mounted in said chamber at one end of said valve stem, a solenoid armature mounted at the other end of said valve stem, a solenoid coil surrounding said armature and energizable for operating said valve stem to reciprocate said valve member into and out of engagement with said valve seat, and a bracket supporting said coil on said base, wherein said bracket has a flat surface with an opening generally aligned with said cover opening and said valve stem extends through said bracket opening, and wherein said assembly further comprises a bracket seal surrounding said valve stem between said bracket and said cover, a cover seal surrounding said valve stem between said bracket seal and said cover, and a spring surrounding said valve stem biasing said bracket seal into engagement with said flat surface of said bracket to seal said bracket opening and biasing said cover seal into engagement with said flat surface said cover to seal said cover opening while permitting lateral movement of said valve stem relative to said bracket and said cover.

* * * * *